United States Patent [19]

Takami et al.

[11] Patent Number: 4,969,860
[45] Date of Patent: Nov. 13, 1990

[54] STEPLESS TRANSMISSION MECHANISM

[75] Inventors: Akira Takami; Toshiyuki Takahara, both of Himeji, Japan

[73] Assignee: Mitsubishi Denki Kabushiki Kaisha, Tokyo, Japan

[21] Appl. No.: 376,445

[22] Filed: Jul. 7, 1989

[30] Foreign Application Priority Data

Jul. 8, 1988 [JP] Japan ................. 63-171513

[51] Int. Cl.$^5$ ............................................. F16H 55/17
[52] U.S. Cl. ......................................... 475/16; 475/17
[58] Field of Search .................... 74/437; 475/16, 17

[56] References Cited

U.S. PATENT DOCUMENTS

| 1,791,386 | 2/1931 | Sprigg | 475/17 X |
| 2,239,313 | 4/1941 | Beschkline | 74/125.5 |
| 2,439,077 | 4/1948 | Conner | 74/437 X |
| 3,075,409 | 1/1963 | Amsler | 475/16 |
| 4,685,348 | 8/1987 | Takami | 74/437 |
| 4,765,195 | 8/1988 | Takami | 74/113 |

FOREIGN PATENT DOCUMENTS 59-42181 10/1984 Japan .

*Primary Examiner*—Dirk Wright
*Attorney, Agent, or Firm*—Sughrue, Mion, Zinn, Macpeak and Seas

[57] ABSTRACT

An stepless transmission mechanism comprises an input shaft rotatably supported by a case, an input frame secured to the input shaft so as to be rotated, an input planet shaft rotatably supported by the input frame, an output shaft rotatably supported by the case and extending coaxially to the input shaft, an output frame rotatably supported by the input shaft and swinging relative to the input frame, an output planet shaft rotatably supported by the output frame, an input rotation transmitting means for transmitting the rotation of the input shaft to the input planet shaft, an output rotation transmitting means for transmitting the rotation of the output planet shaft to the output shaft, a structural body which is composed of a plurality of constituent mechanisms which perform rotation speed modulation in the manner of an exponential function by pairs of non-circular gears inherently having a rotation speed ratio which periodically changes in the manner of an exponential function, so that the body performs stepless speed changing operation in which the relative rotation speed ratio between both the planet shafts is set at the value of an exponential function $e^{k \cdot \alpha}$ where $\alpha$ denotes the angle of the relative swing between both the frames and K denotes a rotation speed modulation coefficient which can be optionally preset so that the pairs of non-circular gears inherently have the coefficient, and fly-apart weights provided between the frames to apply a swing torque to the frames by the centrifugal forces of fly-apart weights on the basis of the rotation speed of the input shaft.

6 Claims, 10 Drawing Sheets

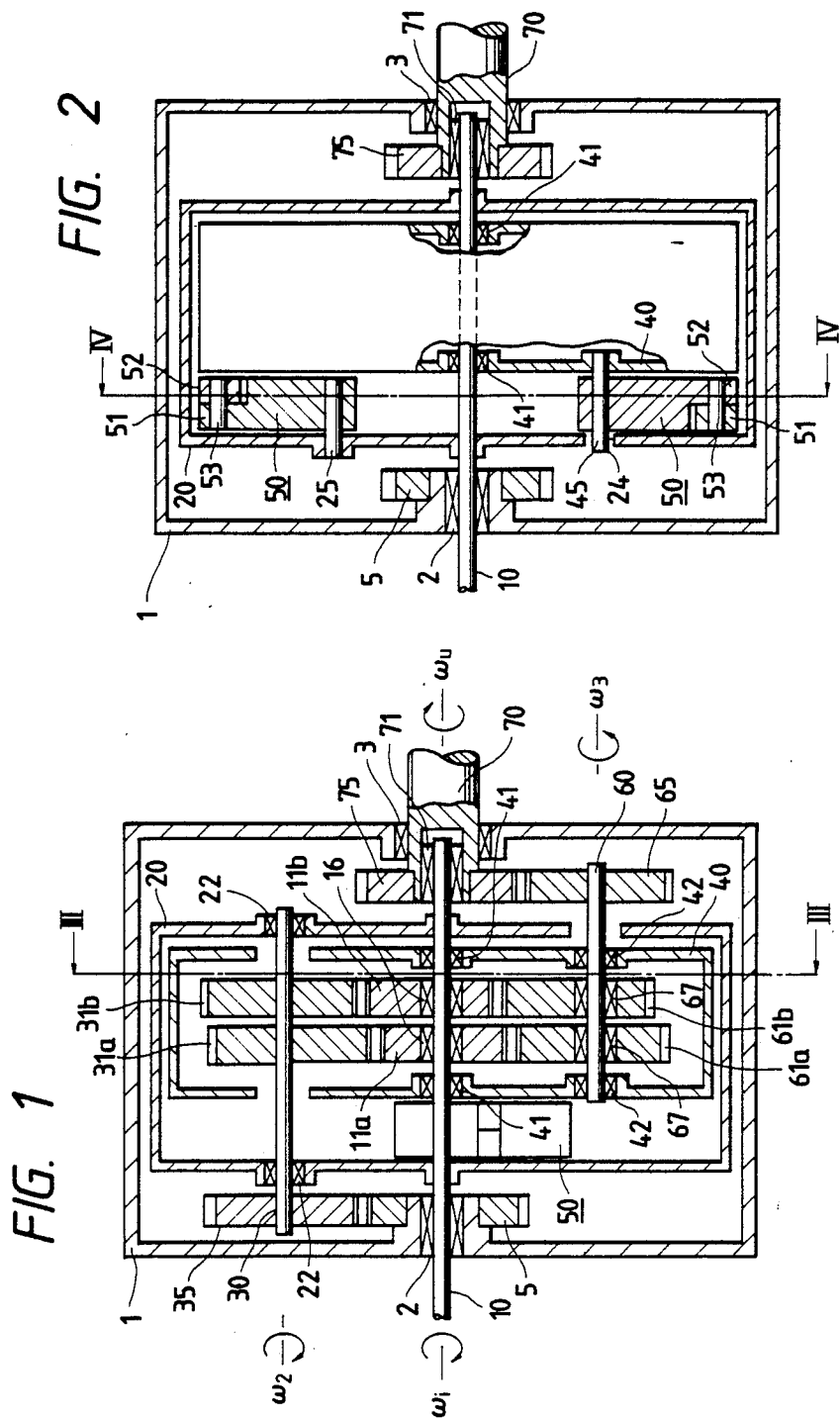

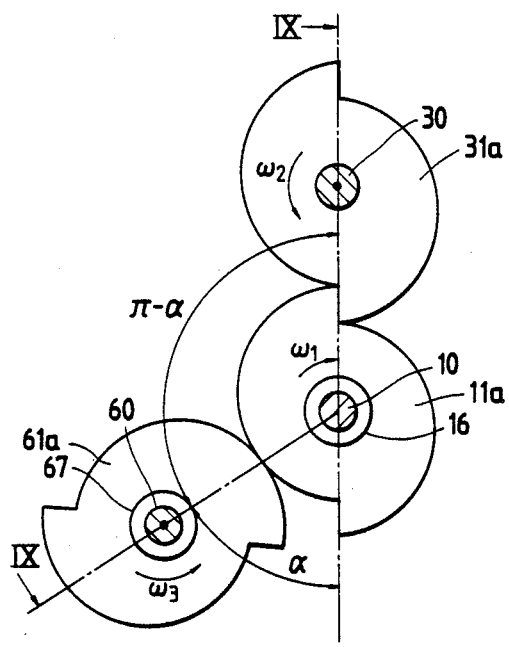
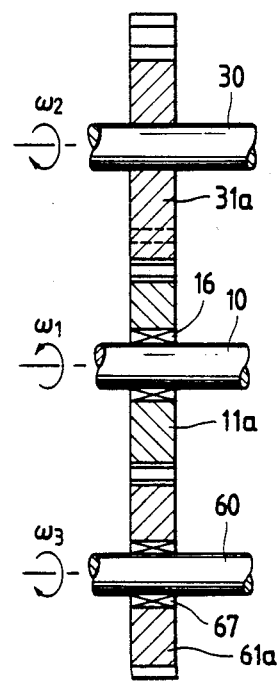
FIG. 8
FIG. 9

STEPLESS TRANSMISSION MECHANISM

BACKGROUND OF THE INVENTION

The present invention relates to a gear-type stepless transmission mechanism usable for motive power machines in general.

A stepless transmission mechanism requires that the ratio of the rotation speed of the output shaft of the transmission mechnism to that of the input shaft thereof is zero. In other words, the ratio of the speed reduction from the input shaft to the output shaft is infinitely great for the range of continuous variableness of the stepless speed changing function of the transmission mechanism A rotation speed ratio for the output to input shafts of zero is a basic requirement and a very important art for performing the ideal control of the characteristic relationship between the angular velocity and shaft torque of the transmission mechanism in the use of the transmission mechanism for a motor vehicle. The use of the transmission is on condition that the motive power transmitted by the transmittion mechanism is substantially constant. A conventional art of such kind and a conventional stepless transmission mechanism based on the art were disclosed in the Japanese patent application (OPI) No. 72966/88 (the term "OPI" as used herein means an "unexamined published application") made by the present applicant. In the conventional stepless transmission mechanism, an elastic torsion member is provided so that preset elastic torque is applied to the member. The elastic torque and torque which is transmitted by the transmission mechanism interact to each other. The deflection angle of the elastic torsion member changes in correlation to the magnitude of the torque transmitted by the transmission mechanism. This relationship automatically regulates the ratio of the rotation speed of the output shaft of the transmission mechanism to that of the input shaft thereof.

The characteristic of the change in the rotation speed ratio of the conventional stepless transmission mechanism depends on that of the preset elastic torque applied to the elastic torsion member, so that stepless speed changing characteristic, which is controlled depending on the magnitude of the torque transmitted by the transmission mechanism, is created. FIG. 20 shows an example of the stepless speed changing characteristic of the conventional stepless transmission mechanism. It is understood from FIG. 20 that the ratio of the rotation speed of the output shaft to that of the input shaft at the time of driving a load which requires output torque of 2 kg.m is set at about −0.13, and input torque necessary for the driving can be calculated to be about 0.26 kg.m. It is a feature of the transmission mechanism that the ratio of the rotation speed of the output shaft to that of the input shaft is controlled depending on not the magnitude of the rotation speed of the transmission mechanism but that of the torque transmitted by the transmission mechanism. For that reason, the matchability of the transmission mechanism to various kinds of prime movers depends on the motive power generation characteristics of the prime movers. The matchability of the transmission mechanism to prime movers such as an external combustion engine, a person and a domestic animal, the torque generation characteristics of which do not depend on the rotation speeds of the prime movers, is high. The matchability of the transmission mechanism to other prime movers such as a D.C. motor with series excitation, for which it is easy to generate high torque in the low rotation speed range, is higher. On the other hand, the matchability of the transmission mechanism to yet other prime movers such as an induction motor and an internal combustion engine, in which very low torque is generated in the low rotation speed range but increases along with the rise in the rotation speed, is low. Since the characteristic of the preset elastic torque applied to the elastic torsion member is more related to the low torque generation side of the low rotation speed range anyway when each of the last-mentioned prime movers is used in a wide range of rotation speed in conjunction with the transmission mechanism, the transmission mechanism is likely to have such a control characteristic as to render it difficult to make full use of the motive power of the prime mover in the high rotation speed range. This is the problem.

SUMMARY OF THE INVENTION

The present invention was made in order to solve the problem. Accordingly, it is an object of the present invention to provide stepless transmission mechanism in which the ratio of the rotation speed of an output shaft to that of an input shaft is mechanically and automatically controlled directly by an internal mechanism of simple constitution, depending on the rotation speed of the input shaft and torque transmitted by the transmission mechanism, and a state of control, in which the ratio of the rotation speed of the output shaft to that of the input shaft is zero, can be stably maintained.

The stepless transmission mechanism provided in accordance with the present invention has not only the function of the above-mentioned conventional stepless transmission mechanism in which the ratio of the rotation speed of the output shaft to that of the input shaft is stably kept at zero by a gear mechanism in the range of continuous variableness of the stepless speed changing operation of the transmission mechanism, but also a function of automatically controlling the rotation speed ratio between the output and the input shafts depending on the magnitude of the rotation speed of the input shaft. The latter function is an effective means for solving the problem of the conventional stepless transmission mechanism. A technical idea which constitutes the main part of the principle of operation of the stepless transmission mechanism provided in accordance with the present invention is that fly-apart weights are provided between an input and an output frames to apply swinging torque to the frames by the centrifugal forces of the weights on the basis of the rotation speed of the input shaft to increase the angle of relative swing between the frames to counter the torque transmitted by the transmission mechanism. The change in the swing angle, which results from the action that the swinging torque and the transmitted torque tend to balance to each other, is utilized to control the rotation speed ratio between the output and the input shafts.

When rotatory power is applied to the input shaft of the stepless transmission mechanism provided in accordance with the present invention, the output shaft thereof receives rotatory power which can be taken out from the transmission mechanism. The rotation speed of the output shaft is determined depending on the characteristic of the rotation speed ratio between the output and the input shafts, which is automatically controlled depending on the load torque of the output shaft and the rotation speed of the input shaft. If the load torque of the output shaft or the rotation speed of the input shaft changes, the rotation speed of the output shaft increases or decreases by an infinite number of continuous steps. Besides, the state in which the rotation speed of the output shaft is zero independently of that of the input shaft is created in the range of the automatic control of the transmission mechanism so that the output shaft is not rotated when the load torque has become or exceeded an output torque limit characteristic value determined by the preset mechanical factors of the transmission mechanism and the instantaneous rotation speed of the input shaft, thereby automatically stopping transmitting the motive power through the transmission mechanism.

BRIEF DESCRIPTION OF THE DRAWINGS

FIGS. 1, 2, 3 and 4 show a stepless transmission mechanism which is an embodiment of the present invention.

FIG. 1 is a sectional view of the transmission mechanism along a line I—I shown in FIG. 3.

FIG. 2 is a sectional view of the transmission mechanism along a line II—II shown in FIG. 4.

FIG. 3 is a sectional view of the transmission mechanism along a line III—III shown in FIG. 1.

FIG. 4 is a sectional view of the transmission mechanism along a line IV—IV shown in FIG. 2.

FIG. 8 is a front view of a rotation speed modulation mechanism shown in FIG. 3.

FIG. 9 is a sectional view of the modulation mechanism along a line IX—IX shown in FIG. 8.

DETAILED DESCRIPTION OF THE PREFERRED EMBODIMENT

Figure 3:
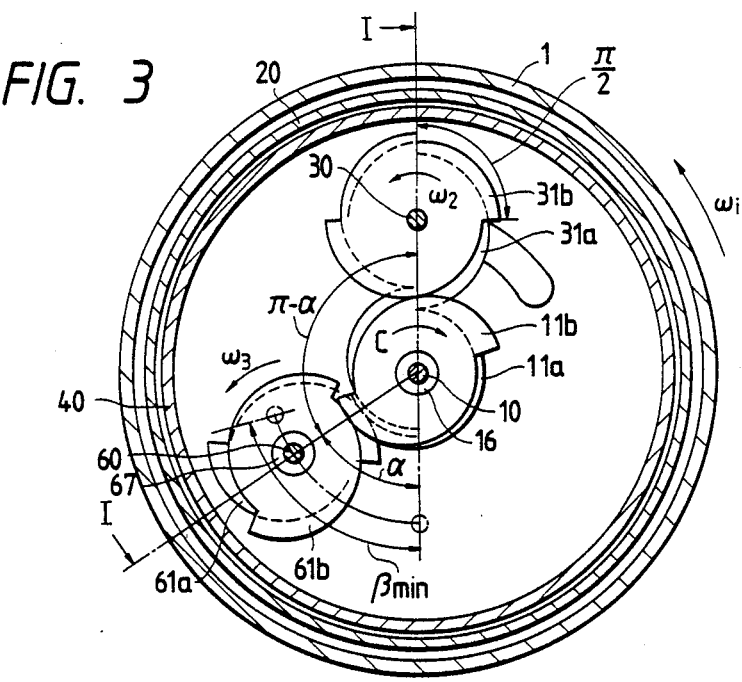

An embodiment of the present invention, which is transmission mechanism, is hereafter described with reference to the drawings attached hereto.

FIGS. 1, 2, 3 and 4 are sectional views of the stepless transmission mechanism. A case 1 is secured to a fixed body such as a base. Bearings 2 and 3 are supported by the case 1. An input center gear 5 is secured to the case 1 so that the gear is always at a standstill. An input shaft 10 is rotatably supported by the bearing 2 at one end of the shaft. An input frame 20 having two side plates is secured to the input shaft 10 and supports a pair of bearings 22. One of the side plates has two swing restriction holes 24, in which first weight support pins 25 are secured. An input planet shaft 30 is rotatably supported by the bearings 22. Non-circular gears 31a and 31b are secured to the input planet shaft 30. An input planet gear 35 is secured to the input planet shaft 30 and engaged with the input center gear 5. An output frame 40 having two side plates is rotatably supported with a pair of bearings 41 on the input shaft 10 and supports a pair of bearings 42. Second weight support pins 45 are secured in one of the side plates of the output frame 40 and inserted in the swing restriction holes 24 at the tips of the pins. A pair of fly-apart weights 50 are provided. Each fly-apart weights 50 includes two members 51 and 52 pivotally coupled to a pin 53 and having sliding holes, in which the first and the second weight support pins 25 and 45 are fitted so that the members are swingable. The swinging torque of the members of each fly-apart weight 50, which is generated by the centrifugal force based on the rotation of the weight around the input shaft 10, acts to the input and the output frames 20 and 40. An output planet shaft 60 is rotatably supported by the bearings 42 and supports non-circular gears 61a and 61b with bearings 67 each having a one-way clutch function. An output planet gear 65 is secured to the output planet shaft 60 at one end thereof. An output shaft 70 is rotatably supported by the bearing 3 at one end of the shaft and supports the input shaft 10 at one end thereof with a bearing 71 provided in the output shaft at the end thereof. An output center gear 75 is secured to the output shaft 70 and engaged with the output planet gear 65. Non-circular gears 11a and 11b are rotatably supported with bearings 16 on the input shaft 10 and engaged with the non-circular gears 31a and 31b and the non-circular gears 61a and 61b.

Figure 4:
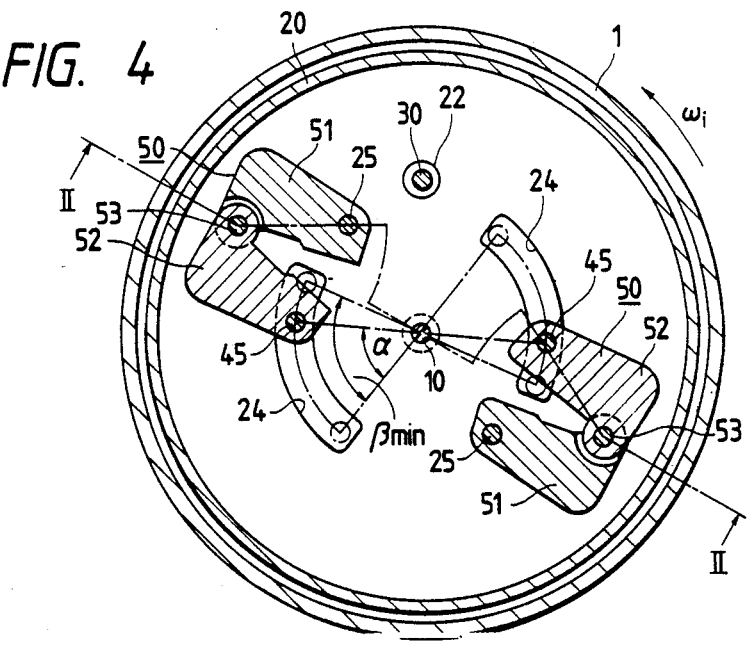

The input and the output frames 20 and 40 can be swung relative to each other about the input shaft 10. The range of the angle $\alpha$ of the swing of the frames 20 and 40, which is shown in in FIGS. 3 and 4, is from 0 rad. to 0.415 rad. When no swinging torque except that of the fly-apart weights 50 acts to the input and the output frames 20 and 40, each second weight support pin 45 is pushed to one end of the corresponding swing restriction hole 24 so that the swing angle $\alpha$ becomes the maximum $\beta$ min. When some swinging torque, which counters that of the fly-apart weights 50, acts to the input and the output frame 20 and 40, the swing angle $\alpha$ is smaller than the maximum $\beta$ min. In that case, the swing angle $\alpha$ changes depending on the former swinging torque and that of the fly-apart weights. If the former swinging torque is balanced to that of the fly-apart weights 50, the swing angle $\alpha$ takes a value shown by an inequality $\beta \min > \alpha > 0$. If the former swinging torque is higher than that of the fly-apart weights 50, the second weight support pins 45 are pushed to the other ends of the swing restriction holes 24 so that the swing angle $\alpha$ is zero.

Figure 5:
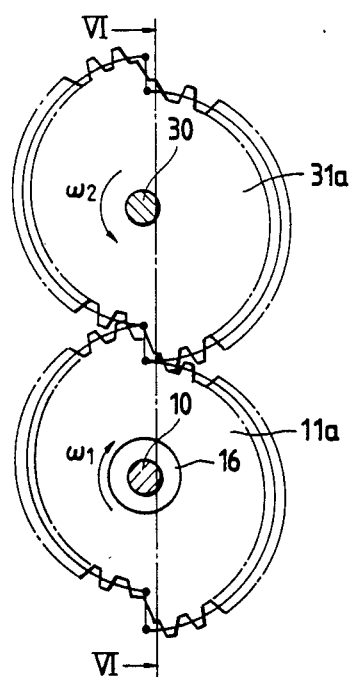
FIG. 5 is a front view of a pair of non-circular gears shown in FIG. 3.
Figure 6:
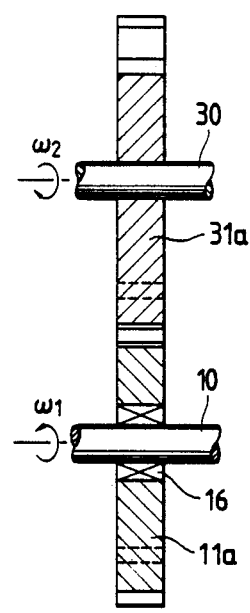
FIG. 6 a sectional view of the non-circular gears along a line VI—VI shown in FIG. 5.
Figure 7:
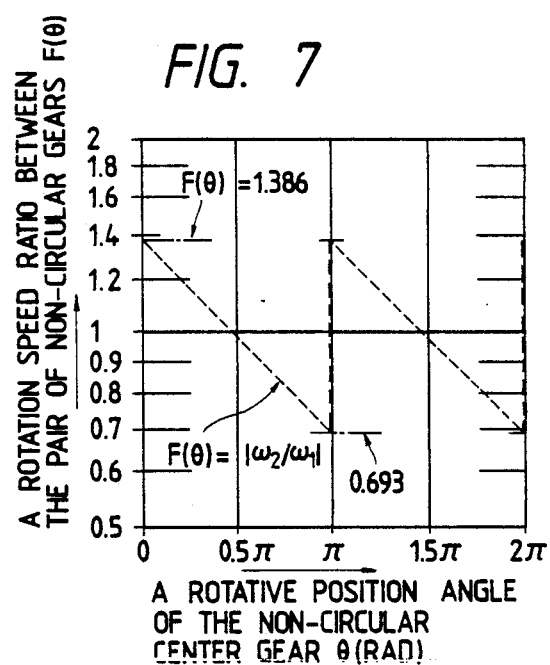
FIG. 7 a graph of the rotation speed ratio between the pair of non-circular gears.

The non-circular gears 31a and 31b and the non-circular gears 61a and 61b are the same as each other in the form of the tooth thereof. The non-circular gears 11a and 11b are the same as each other in the form of the tooth thereof but different from the non-circular gears 31a, 31b, 61a and 61b in that respect. Therefore, the stepless transmission mechanism has two groups of non-circular gears engaged with each other and having two kinds of tooth forms. FIGS. 5 and 6 show one of the two groups which are the same as each other in constitution. The group shown in FIGS. 5 and 6 includes a pair of the non-circular gear 11a and the non-circular gear 31a, which have the two kinds of tooth forms. The pair of the gears 11a and 31a has the same feature as that disclosed in the Japanese Patent Unexamined Publication Nos. 266866/86 and 137464/87. The absolute value $|\omega_2/\omega_1|$ of the ratio of the rotation speed $\omega_1$ of the non-circular gear 11a to that $\omega_2$ of the non-circular gear 31a changes in the manner of an exponential function of the rotative position angle $\theta$ of the non-circular gear 11a in a prescribed range of the angle, as shown in FIG. 7. The change $F(\theta)$ in the rotative position angle $\theta$ is expressed as follows:

$$F(\theta) = |\omega_2/\omega_1| = e^{-K \cdot \theta} \cdot F(O)$$

In the above equation, e denotes the base of natural logarithm, F(O) denotes a reference rotation speed ratio and K denotes a rotation speed modulation coefficient which always takes a plus value. The ratio F(O) and the coefficient K can be optionally designed. In this embodiment, the range of the rotative position angle $\theta$ is from 0 rad. to $\pi$ rad., the reference rotation speed ratio F(O) is 1.386, and the rotation speed modulation coefficient K is 0.2206 rad.$^{-1}$.

Each of the non-circular gears 11a and 31a has teeth having an involute form and provided on the gear along the total circumference thereof, as shown in FIG. 5. Since the relationship in rotation speed, transmitted torque or the like between the mutually engaged gears can be described by using the intermeshing pitch curves thereof, the gears are mainly shown by the intermeshing pitch curves in the drawings.

The novel rotation speed modulation of the stepless transmission mechanism, which results from the above-mentioned rotation speed ratio between the pair of the non-circular gears 11a and 31a, is described from now on. FIGS. 8 and 9 are a front view and a sectional view of the rotation speed modulation mechanism of the transmission mechanism. The modulation mechanism includes not only the non-circular gears 11a and 31a but also the non-circular gear 61a. The pair of the gears 11a and 31a engaged with each other and that of the gears 11a and 61a are hereinafter often referred to as the primary rotation speed modulation means and the secondary rotation speed modulation means, respectively. The primary rotation speed modulation means functions to determine the ratio of the rotation speed $\omega_2$ of the input planet shaft 30 having the non-circular gear 31a secured thereto, to that $\omega_1$ of the non-circular gear 11a. That ratio is hereinafter often referred to as the primary rotation speed ratio. The secondary rotation speed modulation means functions to determine the ratio of the rotation speed $\omega_3$ of the output planet shaft 60 driven by the non-circular gear 61a through the bearing 67 having the one-way clutch function, to that $\omega_1$ of the non-circular gear 11a. That ratio is hereinafter often referred to as the primary rotation speed ratio. The constitution and operation of the secondary rotation speed modulation means are similar to those of the primary rotation speed modulation means, which are described above with reference to FIGS. 5, 6 and 7. However, what should be emphasized now is that the output planet shaft 60 is disposed in a central angle position of $\pi$-$\alpha$ rad. from that of the input planet shaft 30 on the basis of that of the input shaft 10, as shown in FIG. 8. Since the engagement of the non-circular gear 61a with the non-circular gear 11a goes back to the same condition at every central angle of $\pi$ rad. as the non-circular 11a. 61a revolves around the center gear, that the output planet shaft 60 is located in the central angle position of $\pi$-$\alpha$ rad. from that of the input planet shaft 30 is substantially equivalent to that the output planet shaft is located in a central angle position of $-\alpha$ from that of the input planet shaft. For that reason, when the primary rotation speed modulation means is in the state of engagement at the rotative position angle $\theta$ of the non-circular gear 11a, the secondary rotation speed modulation means is in the state of engagement at the rotative position angle $\theta$-60 of the non-circular gear 11a. Therefore, when the primary rotation speed ratio $|\omega_2/\omega_1|$ is $e^{-K \cdot \theta} \cdot F(O)$, the secondary rotation speed ratio is $|\omega_3/\omega_1|$ is $e^{-K \cdot (\theta - \alpha)} \cdot F(O)$. Consequently, the ratio $\omega_3/\omega_2$ of the rotation speed of the output planet shaft 60 to that of the input planet shaft 30 can be calculated to be $e^{K \cdot \alpha}$ by dividing the secondary rotation speed ratio by the primary rotation speed ratio. The value $e^{K \cdot \alpha}$ shows a feature of the rotation speed modulation mechanism of the stepless transmission mechanism, which is a non-circular gear mechanism including the three non-circular gears as shown in FIGS. 8 and 9. The transmission mechanism has two such rotation speed modulation mechanisms, one of which includes the three non-circular gears 11a, 31a and 61a and the other of which includes the non-circular gear 11b, the non-circular gear 31b and the non-circular gear 61b.

Figure 10:
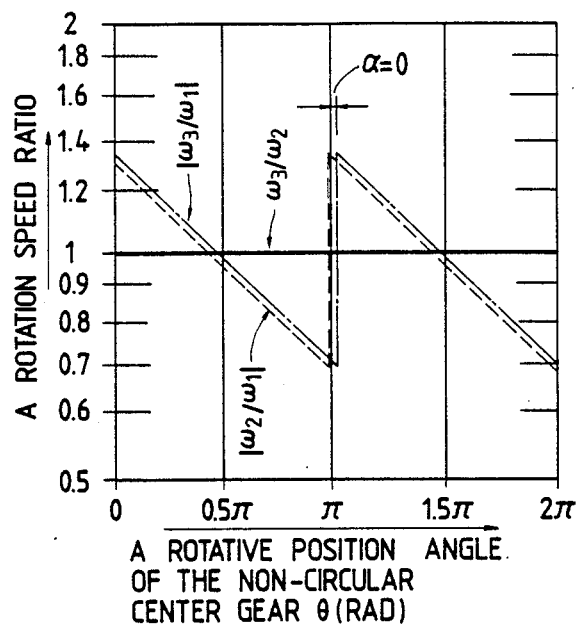
FIGS. 10, 11, 12 and 13 show graphs of the rotation speed modulation characteristics of the modulation mechanism.
Figure 11:
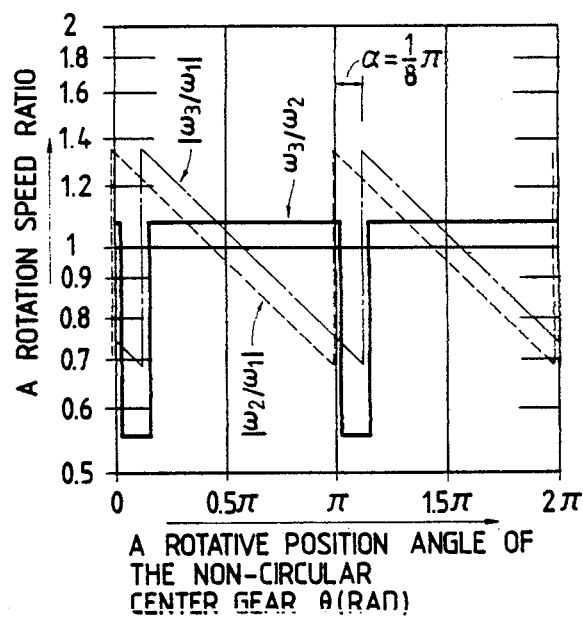
Figure 12:
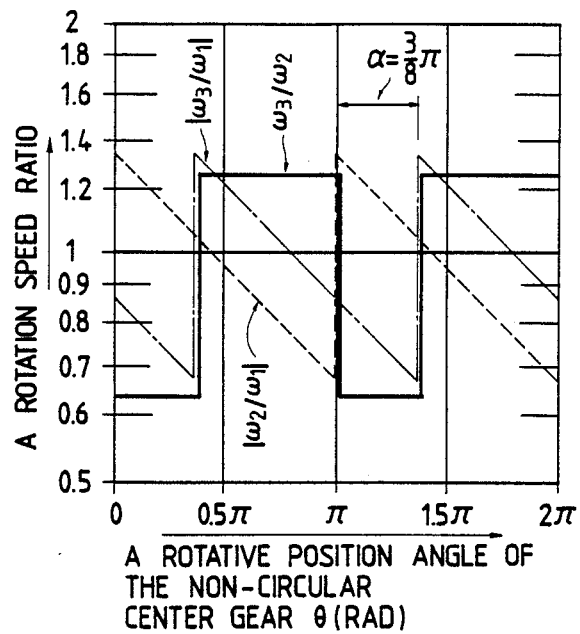
Figure 13:
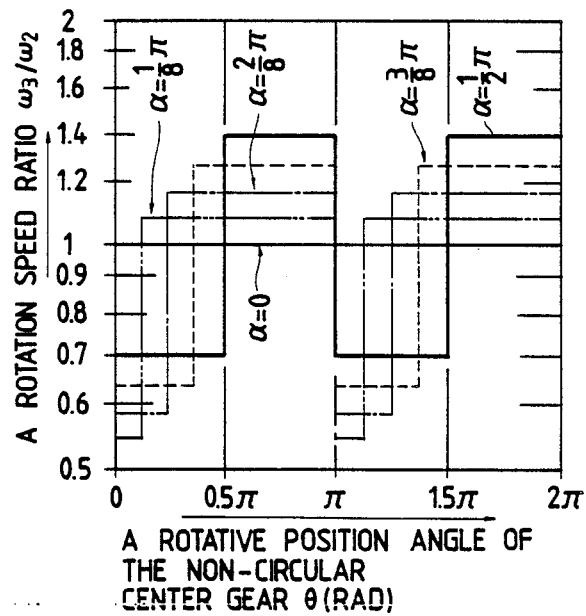

FIGS. 10, 11 and 12 show the rotation speed modulation characteristics of each of the rotation speed modulation mechanisms. FIG. 10 shows the characteristic under a condition of $\alpha = 0$, in which the rotation speed ratio $\omega_3/\omega_2$ is always 1 independently of the value of the rotative position angle $\theta$ indicated along the axis of abscissa. FIG. 11 shows the characteristic under a condition of $\alpha = (\frac{1}{3})\pi$, in which the rotation speed ratio $\omega_3/\omega_2$ takes one of a high a low constant values above and below 1 depending on the value of the rotative position angle $\theta$ indicated along the axis of abscissa. The high constant value is equal to $e^{K \cdot \alpha}$. The low constant value is equal to $e^{K \cdot (\alpha - \pi)}$, but not used in this embodiment. FIG. 12 shows the characteristic under a condition of $\alpha = (\frac{2}{3})\pi$, and indicates in contrast with FIG. 11 that the rotation speed ratio $\omega_3/\omega_2$ changes in correlation to the increase in the value of $\alpha$, and the range of the rotative position angle $\theta$, in which the rotation speed ratio takes continuous values, changes. FIG. 13 shows how the rotation speed ratio $\omega_3/\omega_2$ changes as the value of $\alpha$ is altered by every $(\frac{1}{8})\pi$ rad. from 0 rad. to $\pi$ rad.

The stepless transmission mechanism includes the rotation speed modulation mechanisms, each of which performs the rotation speed modulation in the manner of an exponential function as described above. The swing angle $\alpha$ can be altered manually or automatically by an alteration means. The transmission mechanism has the one-way clutch functions for selecting only a prescribed value from the repeated change patterns of the rotation speed ratio. The alteration means functions jointly for both the rotation speed modulation mechanisms to swing the input and the output frames 20 and 40 relative to each other to alter the swing angle $\alpha$. The fly-apart weights 50 are provided between the input and the output frames 20 and 40 to generate the swinging torque of prescribed characteristics by the centrifugal forces of the weights. The swing angle $\alpha$ is automatically controlled depending on the rotation speed of the stepless transmission mechanism and the torque transmitted by it.

A rotative angle difference of $(\frac{1}{2})\pi$ rad is preset between the non-circular gears 31a and 31b secured to the input planet shaft 30 and belonging to the first and the second rotation speed modulation mechanisms, as shown in FIG. 3. The value $G_1(\theta)$ of the rotation speed ratio $\omega_3/\omega_2$ based on the first rotation speed modulation mechanism and that $G_2(\theta)$ of the rotation speed ratio $\omega_3/\omega_2$ based on the second rotation speed modulation mechanism are kept in a relationship of $G_2(\theta) = G_1(\theta + \beta)$ to each other. $\beta$ in the equation denotes the rotative angle difference between the non-circular gears 11a and 11b on the input shaft 10, which corresponds to the rotative angle difference of $(\frac{1}{2})\pi$ rad. between the non-circular gears 31a and 31b on the input planet shaft 30. The value of $\beta$ is a function of the rotative position angle $\theta$ of the input shaft 10. The minimum value $\beta$ min of $\beta$ is 0.415 $\pi$ rad..

Figure 14:
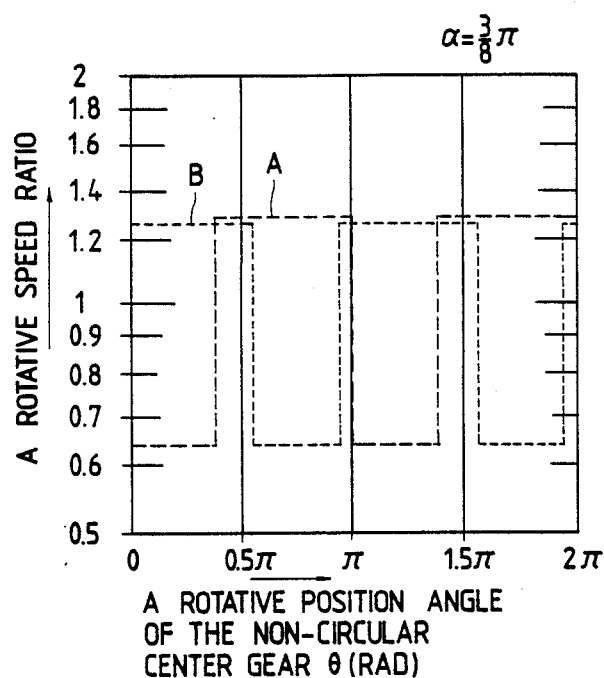
FIG. 14 shows graphs of a state of the speed changing operation of the transmission mechanism.

FIG. 14 shows graphs A and B indicative of the values $G_1(\theta)$ and $G_2(\theta)$ of the rotation speed ratios $\omega_3/\omega_2$ based on the first and the second rotation speed modulation mechanisms. Under a condition of $\alpha \leq \beta$ min, the constant portions $e^{K \cdot \alpha}$ of the values of the rotation speed ratios $\omega_3/\omega_2$ can be made continuous to each other throughout the entire range of the rotative position angle $\theta$ indicated along the axis of abscissa. The graph A and B represent the values $G_1(\theta)$ and $G_2(\theta)$ in the case of $\alpha = (\frac{3}{8})\pi$ under the condition of $\alpha \leq \beta$ min. The plural mechanisms are used in combination so that the constant values $e^{K \cdot \alpha}$ of the rotation speed ratios $\omega_3/\omega_2$ are made continuous to each other.

Selecting only a prescribed value from the plural rotation speed ratio change patterns which are created by the plural rotation speed modulation mechanisms is enabled by the one-way clutch functions. The graphs A and B shown in FIG. 14 indicate the ratios of the rotation speeds of the non-circular gears 61a and 61b of the first and the second rotation speed modulation mechanisms to the rotation speed $\omega_2$ taken as a reference. When the values of the graphs A and B at a value of the rotative position angle $\theta$ indicated along the axis of abscissa are different from each other, a direction of transmission is selected by the one-way clutch function bearings 67 so that rotation of a speed at one of the rotation speed ratios is transmitted to the output shaft 60. Rotatory power is transmitted only from the non-circular gears 61a and 61b to the output planet shaft 60 when the rotation of the gears is in the direction shown in FIG. 3 For that reason, the selection of the direction of transmission mechanism is such that only the higher one of the rotation speed ratios indicated by the graphs A and B is caused to contribute to the driving of the output planet shaft 60 and the one-way clutch function bearings 67 are caused to race to prevent the lower one of the ratios from contributing to the driving of the shaft.

Figure 15:
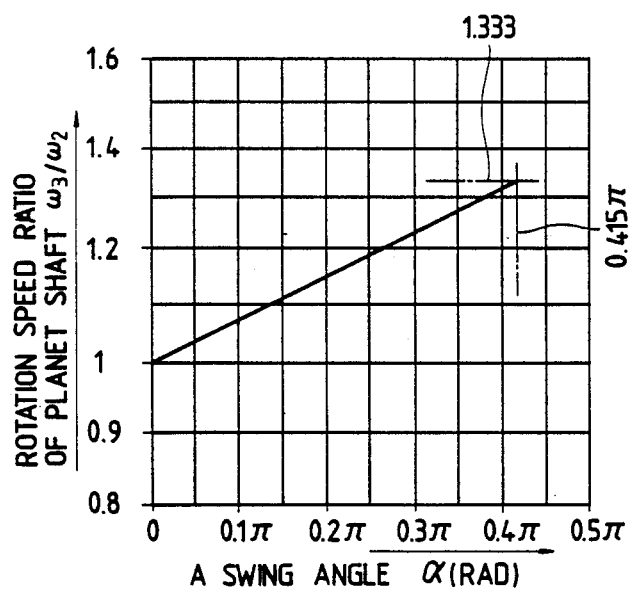
FIG. 15 shows a graph of the overall characteristic of the speed changing operation of the transmission mechanism.

The above description is performed chiefly about the rotation speed modulation of the stepless transmission mechanism, which relates to the rotation speed ratio $\omega_3/\omega_2$ between the input and the output planet shafts 30 and 60. This means that a mechanism not including the input planet gear 35, the input center gear 5, the output planet gear 65 and the output center gear 75 is imagined and only the speeds of rotation of the input and the output planet shafts 30 and 60 around their axes are taken into consideration. FIG. 15 shows a characteristic graph indicative of the ratio of the speed of the rotation of the output planet shaft 60 around its axis to that of the rotation of the input planet shaft 30 around its axis. It is understood from FIG. 15 that an infinite number of rotation speed ratios can be obtained at an infinite number of set values of the swing angle $\alpha$ in the range thereof from the value of $\alpha = 0$ (rad.), which corresponds to the state in which the input and the output planet shafts 30 and 60 are rotated at the same speed, to the value of $\alpha = 0.415$ (rad.), which corresponds to the state in which the rotation speed ratio between the shafts is 1.333. Since the stepless transmission mechanism is a type of a planet gear machine, the relationship between the rotation speeds of the input and the output shafts 10 and 70 of the transmission mechanism can be determined, through conversion, from the characteristic graph shown in FIG. 15. The rotation speed ratio indicated by the characteristic graph shown in FIG. 15 corresponds to that determined on condition that a carrier is unmovably fixed in a procedure of calculation the rotation speed of a planet gear machine. The rotation speed ratio of the stepless transmission mechanism is determined on condition that the frames of the stepless transmission mechanism is unmovable fixed in such a procedure. The ratio of the number of the teeth of the input center gear 5 to that of the teeth of the input planet gear 35 and the ratio of the number of the teeth of the output center gear 75 to that of the tooth of the output planet gear 65 can be optionally preset. These teeth number ratios are significant factors for fixedly adjusting the absolute value of the rotation speed ratio between the input and the output shafts of the stepless transmission mechanism, and have a constant number influence upon the setting of the characteristics of the automatic control, in relation to the torque transmitted by the stepless transmission mechanism and the swinging torque based on the centrifugal action of the fly-apart weights 50, but do not affect the essentials of the rotation speed ratio alteration enabling function of the stepless transmission mechanism. The tooth number ratio between the input center gear 5 and the input planet gear 35 is 1:1, and that between the output center gear 75 and the output planet gear 65 is also 1:1. The ratio of the rotation speed $\omega_u$ of the output shaft to that $\omega_i$ of the input shaft is determined from a component rotation speed table created on the basis of a general method and shown below.

Figure 16:
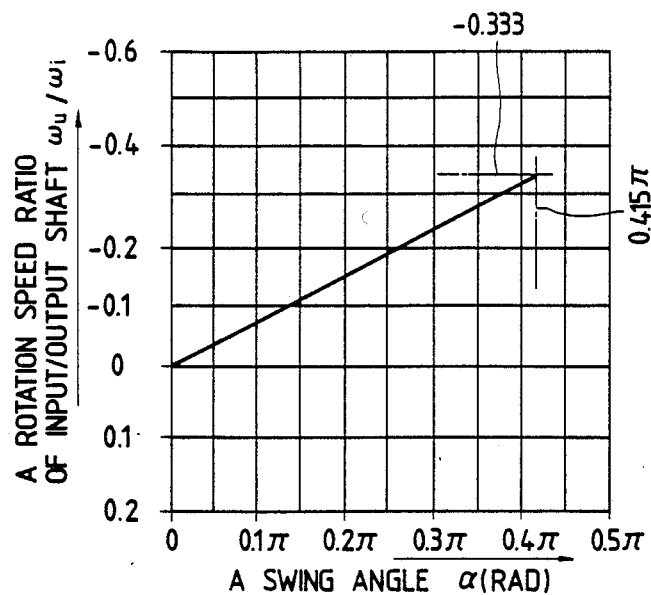
FIG. 16 shows a graph of the rotation speed ratio between the output and input shafts of the transmission mechanism.

It is understood from the table that the rotation speed ratio $\omega_u/\omega_i$ between the input and the output shafts of the stepless transmission mechanism is $-(e^{K \cdot \alpha} - 1)$ which is a function of the swing angle $\alpha$. FIG. 16 shows a graph indicative of the rotation speed ratio $\omega_u/\omega_i$, which can take an infinite number of continuous values in the range of the swing angle u from the value of $\alpha = 0$ (rad.), at

| | Component rotation speed table (unit: rpm) | | | | |
|---|---|---|---|---|---|
| | Component | | | | |
| Con-dition | Input center gear | Input planet gear | Input shaft | Output planet gear | Output shaft |
| Input shaft fixed | $-1$ | $+1$ | 0 | $+e^{K \cdot \alpha}$ | $-e^{K \cdot \alpha}$ |
| Mechanism fixed | $+1$ | $+1$ | $+1$ | $+1$ | $+1$ |
| Net sum | 0 | $+2$ | $+1$ | $+e^{K \cdot \alpha}+1$ | $-(e^{K \cdot \alpha}-1)$ | which the rotation speed ratio is 0, to the value of $\alpha=0.415$ (rad.), at which the rotation speed ratio is $-0.333$. In FIGS. 1, 2, 3 and 4, $\omega_i$ denotes the rotation speed of the input shaft 10, the input frame 20, the output frame 40 and the fly-apart weights 50, and the speed of turning of the input planet shaft 30 and the output planet shaft 60 around their axes, $\omega_2$ denotes the speed of turning of the input planet shaft 30, the non-circular gears 31a and 31b and the input planet gear 35 around their axes, $\omega_3$ denotes the speed of turning of the output planet shaft 60 and the output planet gear 65 around their axes, $\omega_u$ denotes the rotation speed of the output shaft 70 and the output center gear 75, and C denotes the direction of turning of the non-circular gears 11a and 11b around their axes.

Figure 17:
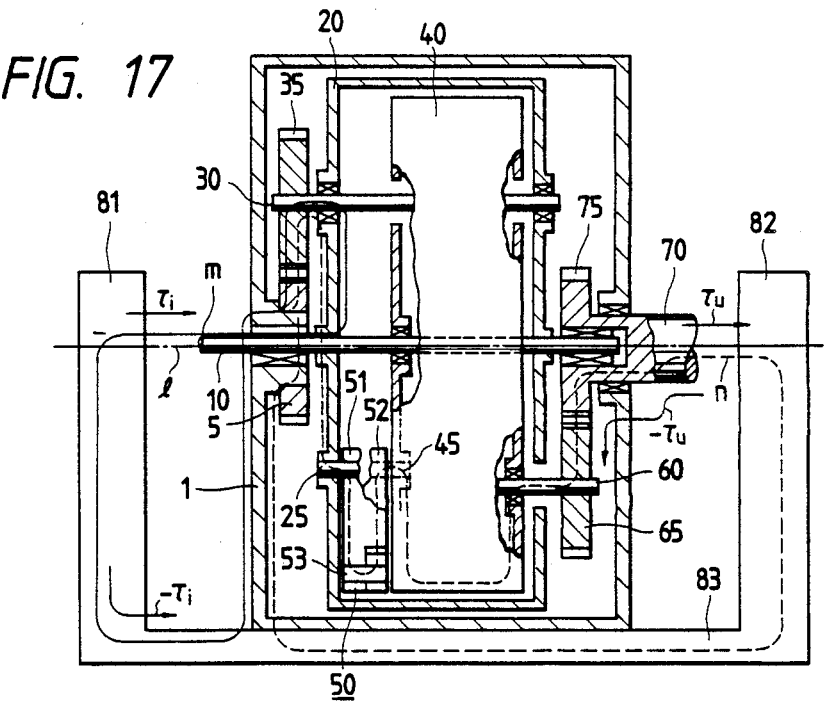
FIG. 17 is a view for describing the balance of torque of the transmission mechanism installed between a prime mover and a load.
Figure 18:
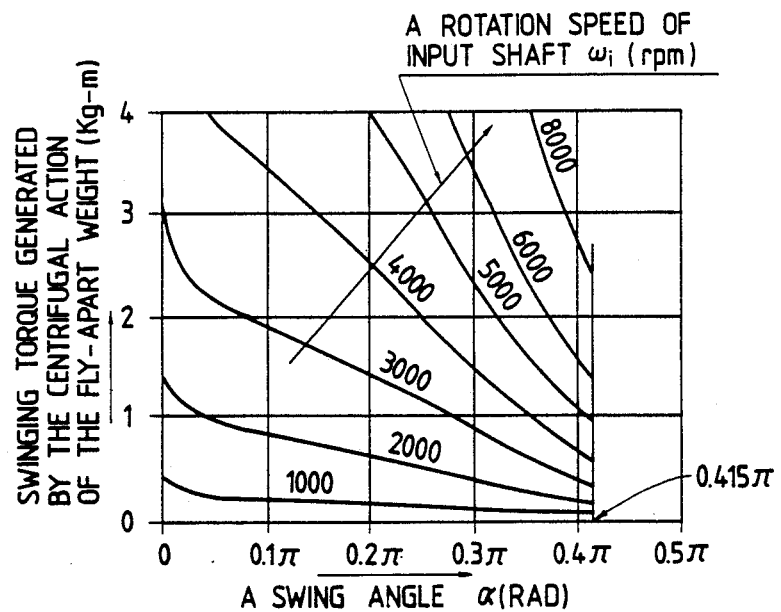
FIG. 18 shows characteristic graphs of swinging torque which acts to the input and output frames of the transmission mechanism due to the centrifugal action of the fly-apart weights thereof.
Figure 19:
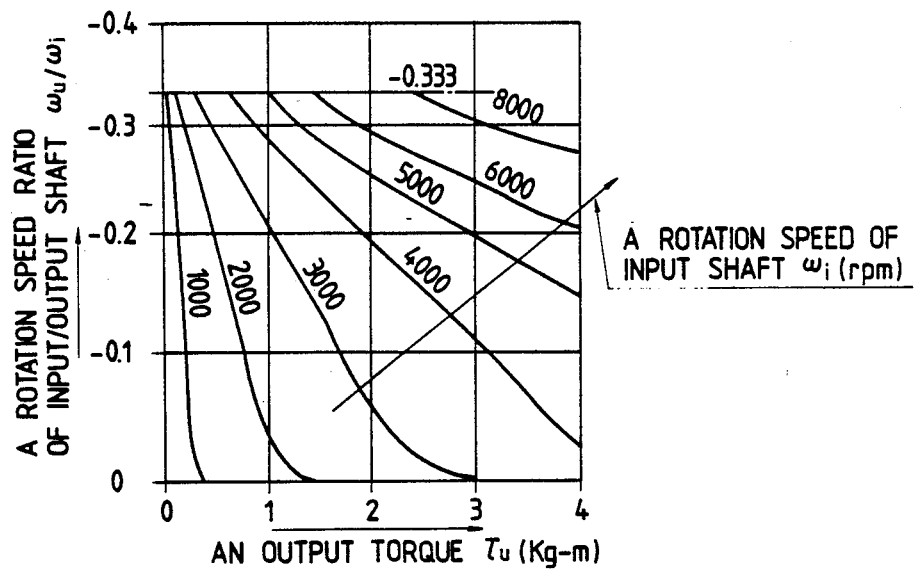
FIG. 19 shows graphs indicative of the characteristics of automatic control of the rotation speed ratio between the output and input shafts of the transmission mechanism in relation to the rotation speed of the input shaft.
Figure 20:
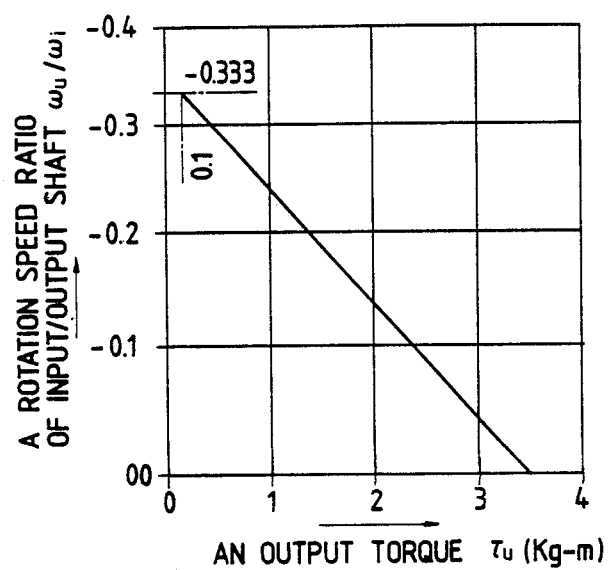
FIG. 20 shows a graph indicative of the stepless speed changing characteristic of a conventional stepless transmission mechanism.

The automatic control of the swing angle $\alpha$ is now described. FIG. 17 is a view for describing the balance of torque in the transmission mechanism transmitting the motive power of a prime mover 81 to a load device 82. The transmission, the prime mover 81 and the load device 82 are secured to a common base 83 so that the transmission, the prime mover and the load device have a common rotation axis l. Input torque $\tau_i$ around the axis l is applied to the transmission mechanism. Output torque $\tau_u$ around the axis l is taken out from the transmission mechanism. The dynamic balance of the input torque $\tau_i$ is maintained in a path m shown by a closed curve in FIG. 17. The dynamic balance of the output torque $\tau_u$ is maintained in a path n shown by a closed curve in FIG. 17. When the prime mover 81 drives the input shaft 10 of the transmission mechanism by the input torque $\tau_i$, reacting torque $-\tau_i$ which balances to the input torque is exerted on the common base 83 by the prime mover. The acting torque $\tau_i$ and the reacting torque $-\tau_i$ balance to each other in the closed-curve path m extending through the input frame 20, the input planet shaft 30, the input planet gear 35, the input center gear 5 and the case 1. When the output shaft 70 drives to load device 82 by the output torque $\tau_u$, reacting torque $-\tau_u$ Which balances to the output torque is exerted on the output frame 40 by the output shaft through the output center gear 75, the output planet gear 65 and the output planet shaft 60. The output torque $\tau_u$ exerted on the load device 82 acts to the input frame 20 through the common base 83, the case 1, the input center gear 5, the input planet gear 35 and the input planet shaft 30. The swinging torque corresponding to the output torque $\tau_u$ acts to the input and the output frames 20 and 40. As a result, the swinging torque based on the centrifugal action of the fly-apart weights 50 provided between the frames 20 and 40 balances to the output torque $\tau_u$ so that the acting torque and the reacting torque in the closed-curve path n balance to each other. The swing angle $\alpha$ is automatically controlled depending on the output torque $\tau_u$ so that the value of the swing angle is determined depending on the characteristic of the swinging torque, which can be optionally preset in terms of the centrifugal action of the fly-apart weights 50. FIG. 18 shows graphs indicative of the relationship between the swing angle $\alpha$ and the characteristic of the swinging torque based on the centrifugal action of the fly-apart weights 50. The rotation speed $\omega_i$ of the input shaft 10 relates as a correlation variable to the swinging torque and the swing angle. FIG. 19 shows characteristic graphs which are indicative of the rotation speed ratio between the output shaft 70 and the input shaft 10 similarly to that shown in FIG. 16 but are conditioned by the input shaft rotation speed $\omega_i$ as a correlation variable. The graphs shown in FIG. 19 are characteristic curves which practically indicate the function of the stepless transmission mechanism in terms of the dynamic action of the input and the output shafts 10 and 70 which constitute the external connection ends of the transmission. Indicated along the axis of abscissa in FIG. 19 is the output torque $\tau_u$ by which the transmission drives the load device 82. Therefore, FIG. 19 shows that the rotation speed ratio between the output and the input shafts 70 and 10 can be controlled to have an infinite number of continuous values as the output torque $\tau_u$ and the rotation speed of the input shaft fluctuate with the lapse of time. When the output torque $\tau_u$ acting to the load device 82 is higher than about 0.4 kg.m at the input shaft rotation speed $\omega_i$ of 1,000 rpm, the output shaft rotation speed $\omega_u$ is 0. When the output torque $\tau_u$ acting to the load 82 is higher than about 3.8 kg.m at the input shaft rotation speed $\omega_i$ of 3,000 rpm, the output shaft rotation speed $\omega_u$ is 0. It is feature of the stepless transmission mechanism that the output shaft rotation speed $\omega_u$ is 0 as the output torque $\tau_u$ changes depending on the input shaft rotation speed $\omega_i$.

Although the swinging torque is applied to the input and the output frames 20 and 40 by the centrifugal action of the fly-apart weights 50 in this embodiment, the swinging torque may be applied to the frames by a means different in constitution from the fly-apart weights As far as the input and the output frames 20 and 40 perform functions described above and including those of supporting the input and the output planet shafts 30 and 60, the forms of the frames may differ from those in this embodiment. Although the swing angle a between the input and the output frames 20 and 40 is restricted by the second weight support pins 45 and the swing restriction holes 24 in this embodiment, the swing angle may be restricted by the different means selected from a large number of conventional swing angle restriction means. Although the stepless transmission mechanism is made of the non-circular gears described with reference to FIGS. 5, 6 and 7, the transmission mechanism may be made of other non-circular gears such as those disclosed in the Japanese patent application (OPI) No. 270863/87. The basic requirements for the forms of the non-circular gears of the transmission are such as those disclosed in the Japanese patent applications (OPI) Nos. 266866/86 and 137464/87.

According to the present invention, a gear-type stepless transmission mechanism, in which the ratio of the rotation speed of an output shaft to that of an input shaft is controlled depending on the rotation speed of the input shaft and torque transmitted by the transmission mechanism, is provided. Since the control is direct internal control, the transmission mechanism has a completely-mechanical automatic control function although the constitution of the transmission is simple. Besides, the transmission mechanism has a function of stably maintaining a controlled state in which the ratio of the rotation speed of the output shaft to that of the input shaft is zero. When the gear-type stepless transmission mechanism having the automatic control function is used to transmit rotatory power, a wide range of automatic control, which includes avoiding transmitting the power at the time of the insufficiency of the output power from the transmission due to the low output rotation speed thereof and includes avoiding transmitting the power to make the rotation speed of a prime mover or a driven machine critical, can be performed. Therefore, if the present invention is applied to a field of driving such a device of wide rotation speed range as a motor vehicle and a machine tool, an internal combustion engine and an electric motor, each of which is a prime mover whose properties are originally inappropriate to the widely changing rotation speed of the device, can be rationally matched with the device to economize material or energy.

What is claimed is:

1. An stepless transmission mechanism comprising:
an input shaft rotatably supported by a case;
an input frame secured to said input shaft so as to be rotated;
an input planet shaft rotatably supported by said input frame;
an output shaft rotatably supported by said case and extending coaxially to said input shaft;
an output frame rotatably supported by said input shaft and swing relative to said input frame;
an output planet shaft rotatably supported by said output frame;
an input rotation transmitting means for transmitting the rotation of said input shaft to said input planet shaft;
an output rotation transmitting means for transmitting the rotation of said output planet shaft to said output shaft;
a structural body which is composed of a plurality of constituent mechanisms which perform rotation speed modulation in the manner of an exponential function by pairs of non-circular gears inherently having a rotation speed ratio which periodically changes in the manner of an exponential function, so that said body performs stepless speed changing operation in which the relative rotation speed ratio between both said planet shafts is set at the value of an exponential function $e^{K \cdot a}$ where $a$ denotes the angle of the relative swing between both said frames and K denotes a rotation speed modulation coefficient which can be optionally preset so that said pairs of non-circular gears inherently have said coefficient; and
means for applying a swing torque to said frames by the centrifugal forces of fly-apart weights, provided between said frames, on the basis of the rotation speed of the input shaft.

2. A stepless transmission mechanism according to claim 1, wherein each of said fly-apart weights includes two members pivotally coupled to a pin and having sliding holes, in which said pin is fitted in said holes in such a manner that said members are swingable.

3. A stepless transmission mechanism according to claim 2, wherein, said applying means has swing restricting holes provided on said input frame, first weight support pins secured on said input frame and second weight support pins secured on said output frame, said second pins being inserted into said swing restriction holes, respectively.

4. A stepless transmission mechanism according to claim 1 wherein, said fly-apart weights provided between both said frames to apply swinging torque thereto by the centrifugal forces of said weights to increase a swing angle between said frames to counter the swing angle decreasing action of torque transmitted by said transmission mechanism, whereby the ratio of the rotation speed of said output shaft to that of said input shaft is controlled to have an infinite number of continuous values depending on the magnitude of the rotation speed of said input or output shaft and that of said torque transmitted by said transmission mechanism.

5. An stepless transmission mechanism characterized by comprising an input frame secured to an input shaft so as to be rotated; an output frame supported in said input frame so that said output frame can be swung relative to said input frame, about the axis of said input shaft; an input planet shaft supported by said input frame so that said input planet shaft can be rotated around the axis thereof; an output planet shaft supported by said output frame so that said output planet shaft can be rotated around the axis thereof; a structural body which is composed of a plurality of constituent mechanisms which perform rotation speed modulation in the manner of an exponential function by pairs of non-circular gears inherently having a rotation speed ratio which periodically changes in the manner of an exponential function, so that said body performs infinite-step speed changing operation in which the relative rotation speed ratio between both said planet shafts is set at the value of an exponential function $e^{K \cdot a}$ where $a$ denotes the angle of the relative swing between both said frames and K denotes a rotation speed modulation coefficient which can be optionally preset so that said pairs of non-circular gears inherently have said coefficient; an input rotation transmitting means for transmitting the rotation of said input shaft to said input planet shaft; an output shaft extending coaxially to said input shaft and disposed opposite said input shaft across said input frame; an output rotation transmitting means for transmitting the rotation of said output planet shaft to said output shaft; and fly-apart weights provided between both said frames to apply swinging torque thereto by the centrifugal forces of said weights to increase said angle to counter the swing angle decreasing action of torque transmitted by said transmission mechanism, whereby the ratio of the rotation speed of said output shaft to that of said input shaft is controlled to have an infinite number of continuous values depending on the magnitude of the rotation speed of said input or output shaft and that of said torque transmitted by said transmission mechanism.

6. An stepless transmission mechanism comprising an input shaft rotatably supported by a case secured to a fixed body; an input frame secured to said shaft so as to be rotated; an input planet shaft supported by said frame so that said input planet shaft can be rotated around the axis thereof; an output frame supported by said input shaft so that said output frame can be swung relative to said input frame; an output planet shaft supported by said output frame so that said output planet shaft can be rotated around the axis thereof; a structural body composed of a plurality of constituent mechanisms which performs rotation speed modulation in the manner of an exponential function and constitute a primary and a secondary rotation speed modulation means made of pairs of non-circular gears inherently having a rotation speed ratio which periodically changes in the manner of an exponential function, so that said structural body performs stepless changing operation in which the ratio of the around-one's-axis rotation speed of said output planet shaft to that of said input planet shaft is set at the value of an exponential function $e^{K \cdot \alpha}$ where $\alpha$ denotes the angle of the relative swing between both said frames and K denotes a rotation speed modulation coefficient which can be optionally preset so that said pairs of non-circular gears inherently have said coefficient; an input center gear secured to said case coaxially to said input shaft so that said input center gear is always at a standstill; an input planet gear secured to said input planet shaft and engaged with said input center gear; an output planet gear secured to said output planet shaft; an output center gear engaged with said output planet gear; an output shaft to which said output center gear is secured and which is rotatably supported by said case coaxially to said input shaft; and fly-apart weights provided between both said frames to apply swinging torque to said frames by centrifugal forces to increases said angle.

* * * * *